A. E. CHURCH.
CHUCK.
APPLICATION FILED JULY 20, 1914.
1,117,480.
Patented Nov. 17, 1914.
5 SHEETS—SHEET 4.
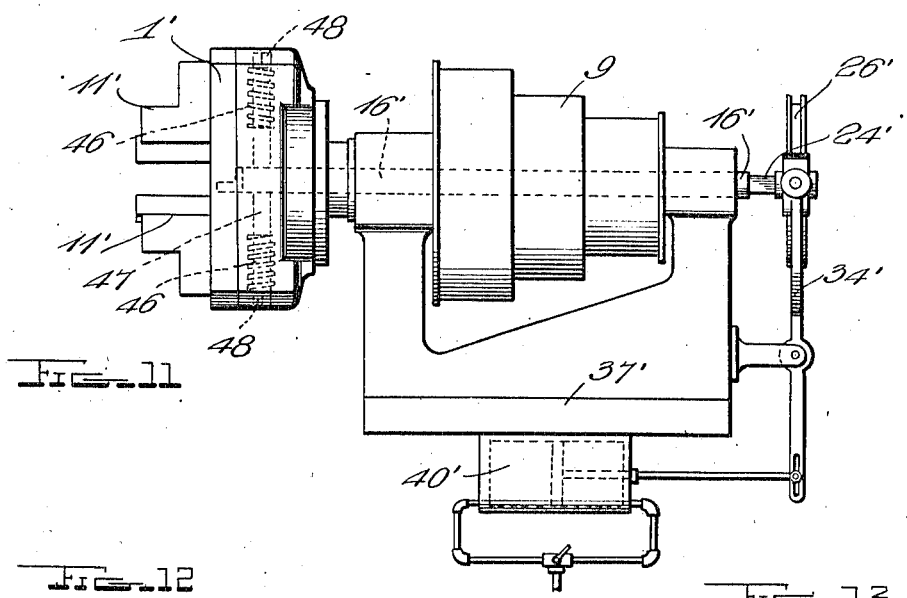
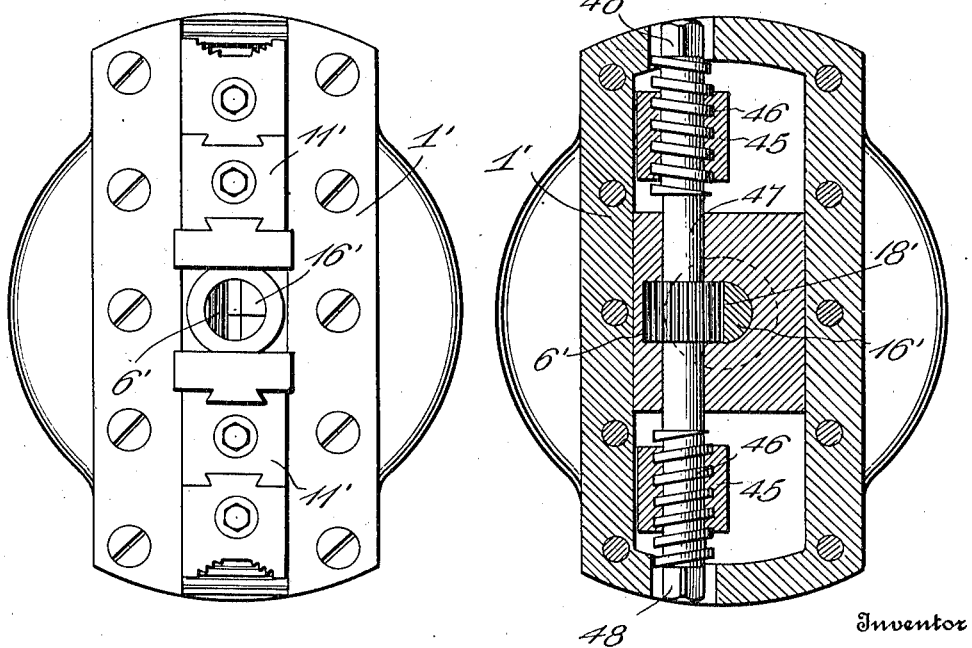
Witnesses
Inventor
A. E. Church

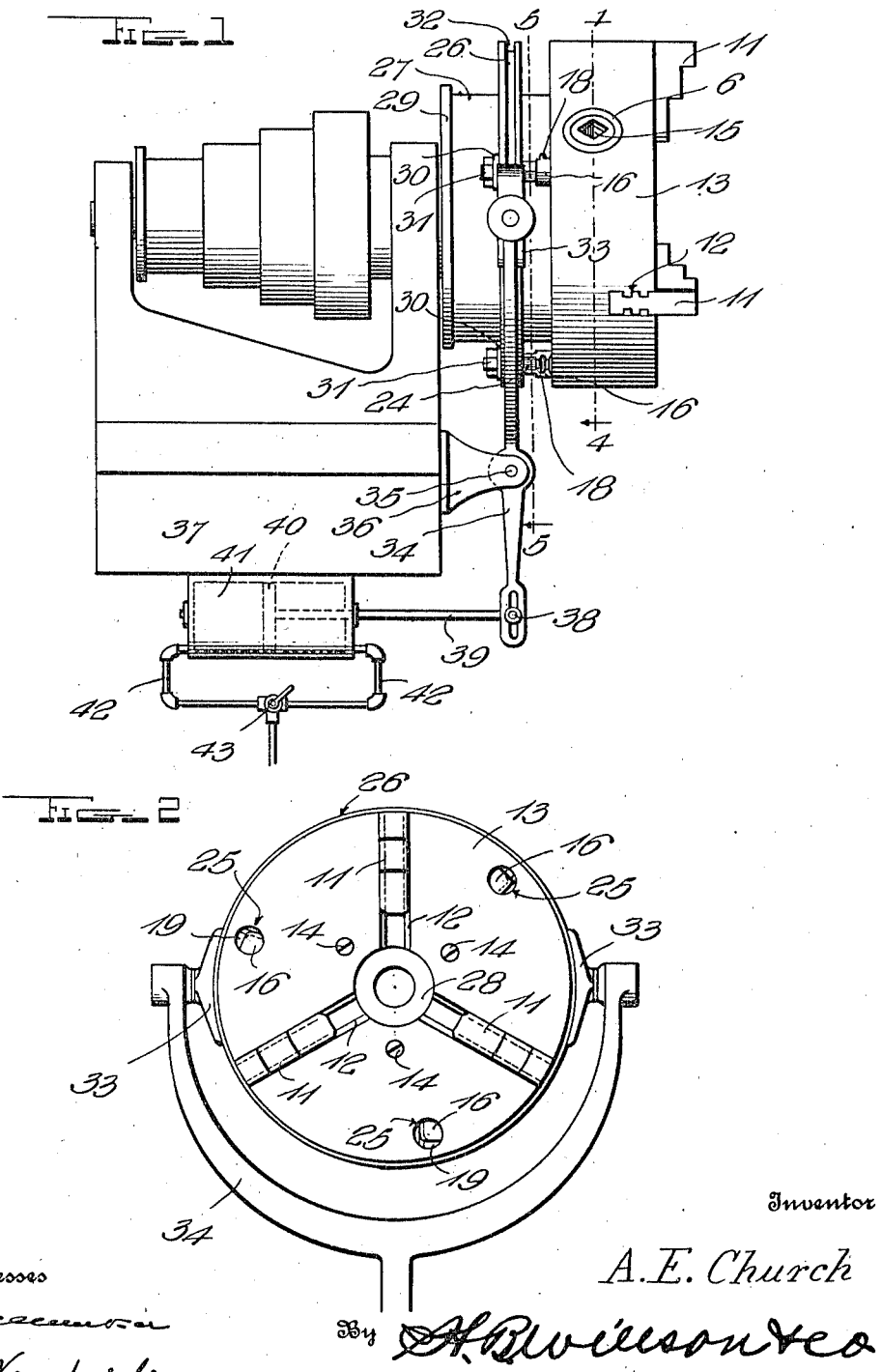

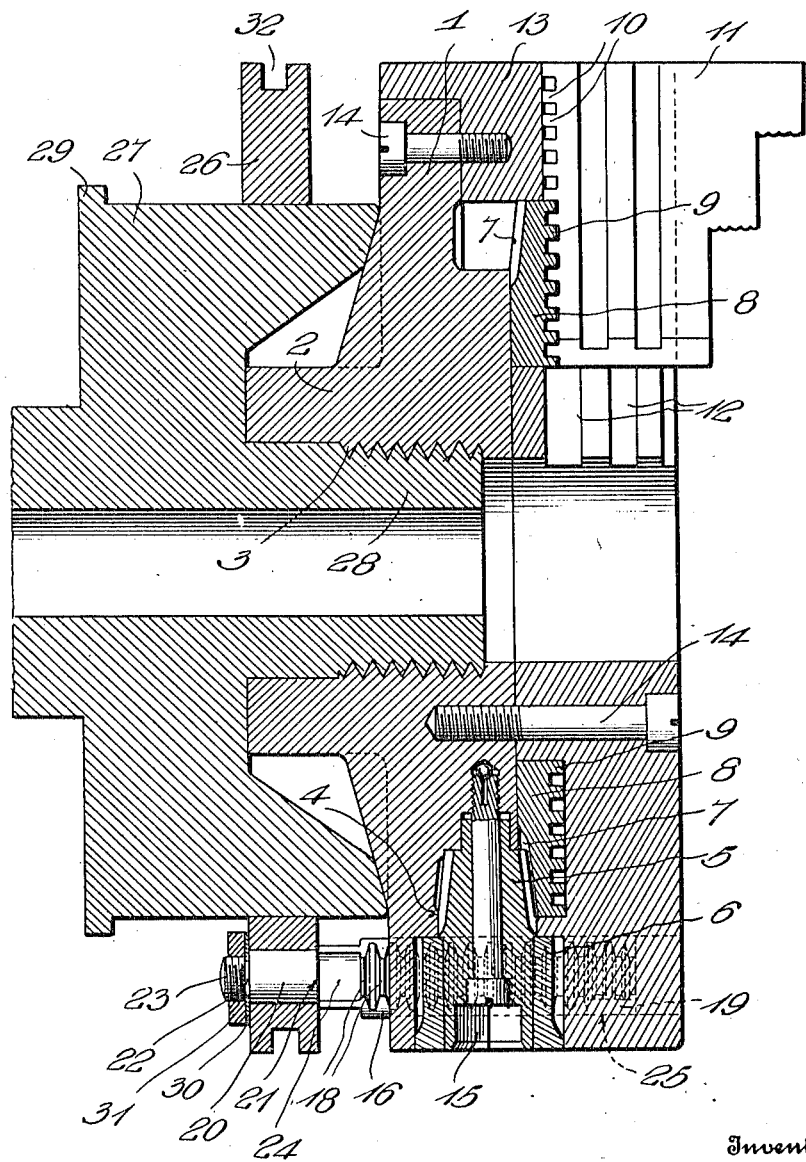

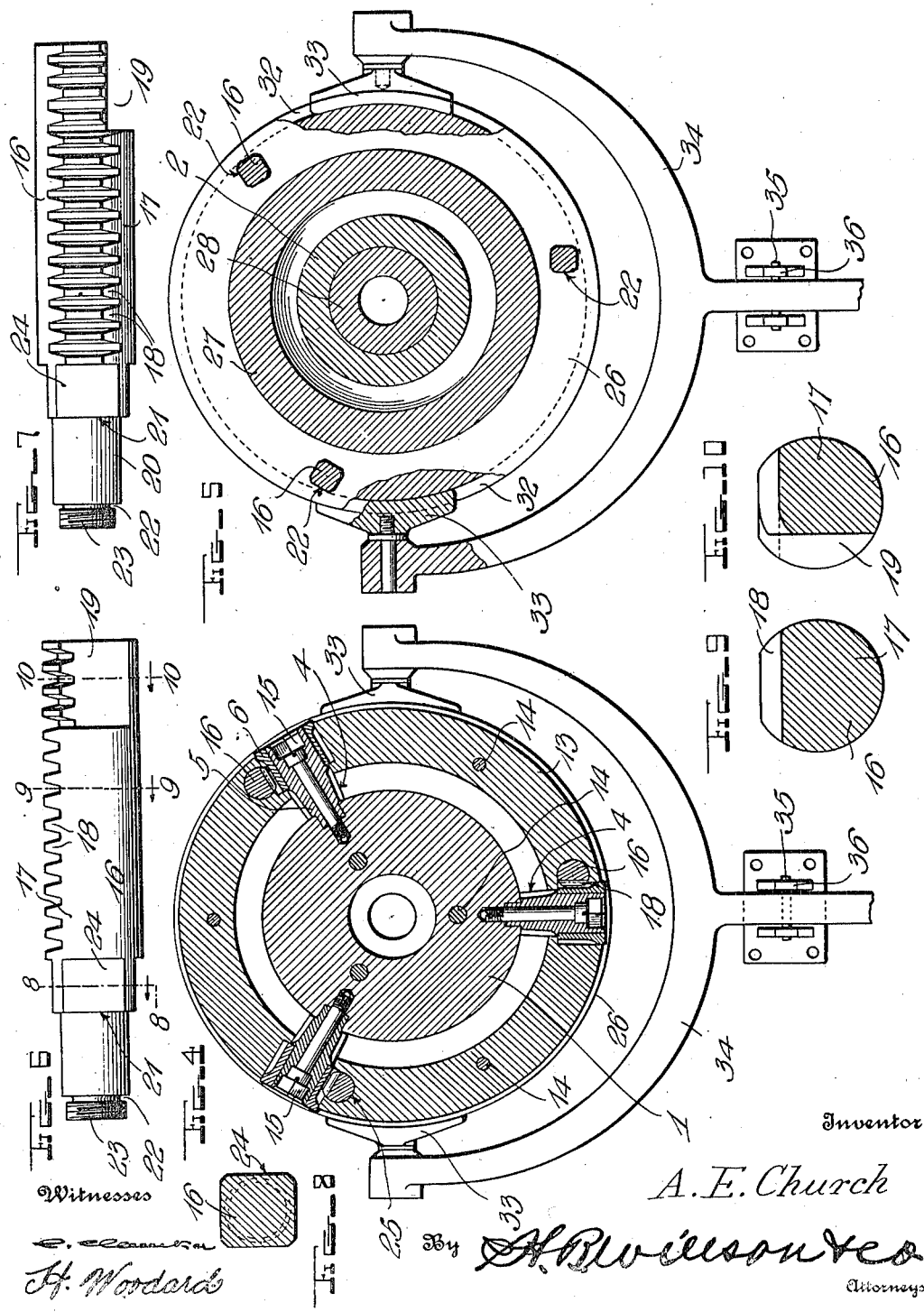

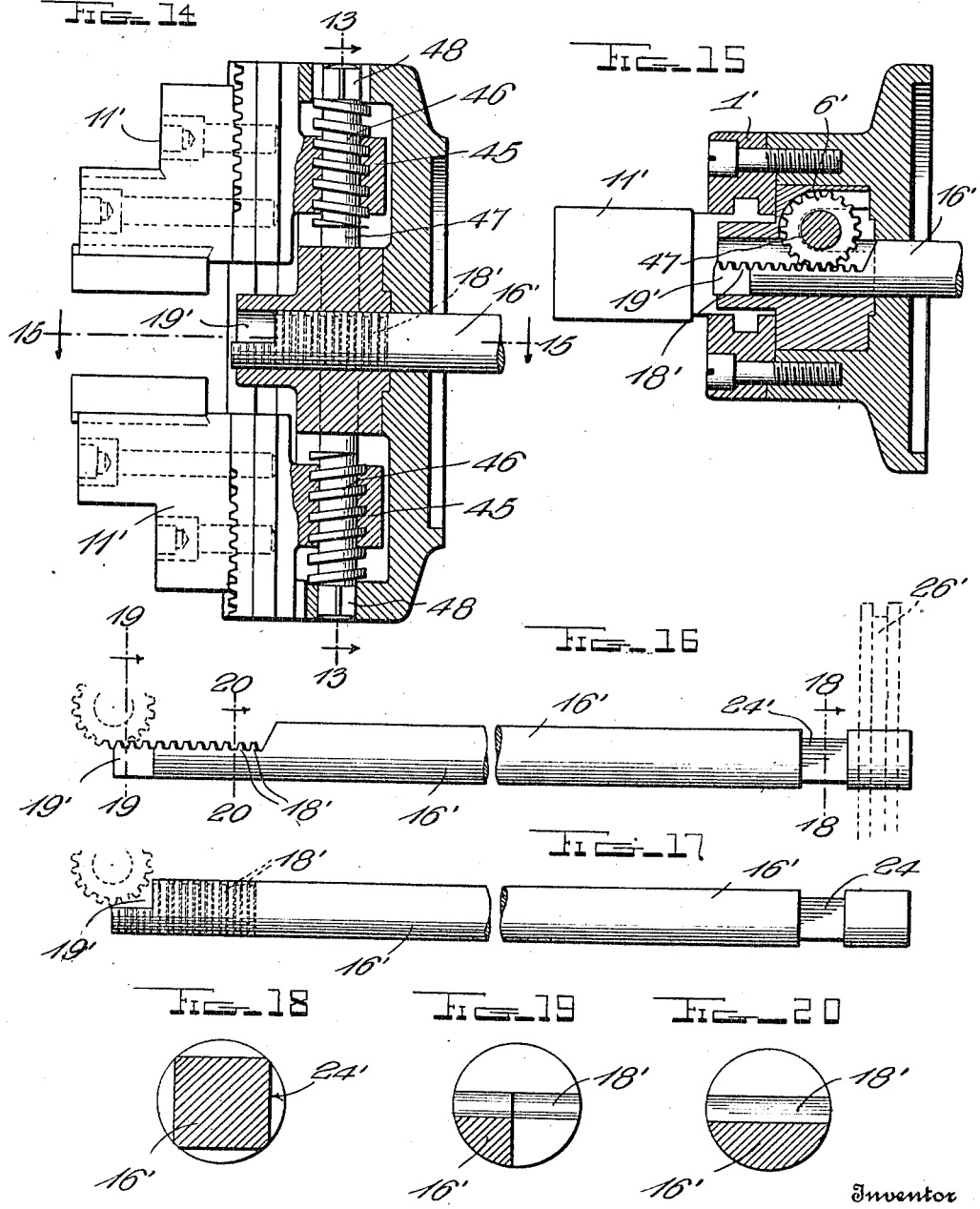

UNITED STATES PATENT OFFICE.

ALBERT E. CHURCH, OF NEW BRITAIN, CONNECTICUT.

CHUCK.

1,117,480.

Specification of Letters Patent.

Patented Nov. 17, 1914.

Application filed July 20, 1914. Serial No. 852,017.

*To all whom it may concern:*

Be it known that I, ALBERT E. CHURCH, a citizen of the United States, residing at New Britain, in the county of Hartford and State of Connecticut, have invented certain new and useful Improvements in Chucks; and I do declare the following to be a full, clear, and exact description of the invention, such as will enable others skilled in the art to which it appertains to make and use the same.

My invention relates to improvements in chucks and more particularly to those so constructed as to allow the jaws thereof to be quickly retracted or projected by the action of a compressed air cylinder or the equivalent thereof.

The invention comprises a body portion, a plurality of jaws movably mounted thereon, a pinion whereby said jaws may be operated, an operating bar slidably and revolubly mounted on said body, rack teeth on said bar engaged with the teeth of said pinion, one end portion of certain of said teeth being removed to allow the same to clear the pinion upon rotation of the bar, means whereby said bar may be rotated and independent means whereby the same may be shifted.

I am aware that devices of this general character employing a pinion and a shiftable rack bar have been employed for operating the jaws of a chuck but as above suggested, I provide means whereby the teeth of the rack bar may be disengaged from the teeth of the pinion, thereby allowing said pinion to be turned independently of the movements of the rack bar whereby the jaws may be manually adjusted after which the rack bar may be again turned to interengage its teeth with the teeth of the pinion thus placing the device in shape to be again operated by the shifting of the bar.

From the above, it will be seen that the main object of my invention is to improve upon devices of the general character heretofore employed to such an extent as to allow the teeth of the rack bar to be engaged with the teeth of the pinion when it is desired to operate the jaws by the use of said bar and to provide means whereby the teeth of the two elements may be disengaged entirely thus allowing the jaws to be manually adjusted. Were the rack bar allowed to move outwardly to an extent great enough, it will be noted that its teeth would disengage the teeth of the pinion thus allowing the jaws to be manually adjusted but it will further be seen that it is highly desirable to have the teeth of the rack bar meshing with the teeth of the pinion at all times when said bar is being employed for operating the device.

A further object of my invention therefore is to provide a stop whereby the outward movement of the rack bar is limited to such an extent as to dispose the notched ends of certain of the rack teeth opposite the active teeth of the pinion whereby, when the rack is rotated, its teeth will disengage the teeth of said pinion.

With the above objects in view, the invention resides in certain novel features of construction and combination herein described and claimed and shown in the drawings wherein—

Figure 1 is a side elevation of a chuck constructed in accordance with my invention, the chuck being of the three jaw type; Fig. 2 is an end view of parts seen in Fig. 1: Fig. 3 is a central vertical section through the body portion of the chuck; Figs. 4 and 5 are vertical transverse sections taken on the lines 4—4 and 5—5 of Fig. 1; Figs. 6 and 7 are side elevations of one of the rack bars showing the same in two of its adjusted positions; Figs. 8, 9 and 10 are vertical transverse sections taken on the lines 8—8, 9—9 and 10—10 of Fig. 6; Fig. 11 is a side view similar to Fig. 1 showing the application of the invention to the two jaw chuck; Fig. 12 is an end view of the chuck proper; Fig. 13 is a vertical transverse section taken on the line 13—13 of Fig. 14; Fig. 14 is a vertical section partly in elevation; Fig. 15 is a horizontal section taken on the line 15—15 of Fig. 14; Figs. 16 and 17 are side views of the rack bar employed by this type of chuck showing respectively its operative and inoperative positions; and Figs. 18, 19 and 20 are detail transverse sections taken on the lines 18—18, 19—19 and 20—20 of Fig. 16.

In the accompanying illustration, from Figs. 1 to 10 inclusive, I have shown my improved chuck as comprising an upright body portion 1 in the form of a circular plate having an outwardly extending hub 2 which is provided with a bore having a number of screw threads 3 therein. At suitably spaced intervals, the forward corner of the body 1 is notched as indicated at 4 to revolubly receive a number of beveled gears 5 whose outer ends are provided with toothed rings 6 constituting pinions for operating said gears. By reference more particularly to Fig. 3, it will be seen that the teeth of the beveled gears 5 mesh with the radial teeth 7 formed on a jaw operating ring 8, the latter preferably having a double spiral thread 9 on its forward face, said thread engaging with the teeth 10 formed on the inner edges of a plurality of gripping jaws 11 which are here shown as slidably mounted in guideways 12 formed in a circular plate 13 secured by means of screws 14 to the body 1. It will be noted that the outer ends of the beveled gears 5 are provided with polygonal recesses 15 adapted to receive a key whereby said gears may be rotated to manually rotate the ring 8 to adjust the jaws 11 inwardly or outwardly as the case may be.

In connection with the above described structure, a number of rack bars 16, constituting the gist of the present invention, are employed. Each of the bars 16 comprises a cylindrical body portion 17, a number of rack teeth 18 formed thereon, one end of each of said teeth at the inner end of the bar 16, being removed as indicated at 19 by notching one side of the body portion 17. The opposite end portion of each bar 16 is reduced as at 20 to provide a stop shoulder 21, said part 20 being again reduced as at 22 and extended as at 23, said extended portion being externally threaded. In addition to the other provisions made on each of the bars 16, the same is provided at a suitable point with a number of flat surfaces 24 by means of which the same may be rotated by the use of a wrench or other tool.

As clearly seen in the various figures of the drawings, a rack bar 16 is slidably mounted in a guideway 25 located adjacent each pinion 6, the teeth of the bars 16 normally engaging the teeth of the pinion whereby, when said bars are shifted inwardly or outwardly, the pinions will be rotated which in turn imparts movement to the beveled gears 5 to rotate the ring 8, thereby adjusting the jaws 11 inwardly or outwardly as the case may be.

For the purpose of simultaneously shifting all of the rack bars 16, a ring 26 is provided which is slidably mounted upon a cylindrical guide member 27 having a hub 28 engaged with the screw threads 3 and also having a stop flange 29 on its rear or outer edge, said flange being adapted to limit the outward or rearward movement of the ring 26 for a purpose to appear. As clearly seen in Fig. 3, the reduced end portions 20 of the rack bars 16 pass loosely through transverse openings formed through the ring 26, the shoulders 21 contacting with the inner side of the ring when the parts are in this position while the shoulder formed by reducing the bar at 22, lies flush with the outer surface of the ring, a washer 30 and a nut 31 being located on the threaded extension 23, the former bearing against said last mentioned shoulder whereby all of the rack bars are rotatably mounted and whereby the same may be shifted simultaneously as the ring 26 is shifted.

For accomplishing the shifting of the ring 26, the same is preferably grooved upon its periphery as indicated at 32, said groove receiving a pair of shoes 33 carried pivotally by the ends of a fork 34 which is shown as pivoted upon a horizontal pin 35 whose opposite ends engage ears 36 carried by the head stock 37 of a lathe or other machine, the lower end of the shank of said fork 34 being loosely connected as indicated at 38 with a piston rod 39, the latter having a piston 40 mounted in a fluid pressure cylinder 41 which is provided with pipe connections 42 and with an air valve 43 whereby pressure may be allowed to enter either end of said cylinder to force the piston in the desired direction, thereby, through the action of the fork, shifting the ring 26 upon the cylindrical guide member 27 to accomplish the effects above set forth.

It is to be noted that the ring 26 is allowed to move outwardly or rearwardly only a predetermined distance and that this distance is insufficient to allow the teeth of the rack bars to disengage the teeth of the pinion 6 thereby, when the racks are being employed for alternately retracting and projecting the jaws 11, retaining the rack teeth in mesh with the pinion and thus always allowing said jaws to have the same amount of movement.

When, however, it becomes necessary to move said jaws outwardly or inwardly for the purpose of allowing the same to grip different sized work, the ring 26 may be retracted to its greatest extent which positions the notches 19 adjacent the active teeth of the pinions 6 thereby, when said rack bars are turned in the above set forth manner, allowing said active teeth of the pinions to be positioned in said notches in which position the shaft of the rack bars will be disengaged from the teeth of the pinions, thereby allowing the jaws to be manually adjusted by the insertion of a key into the recesses 15. After the adjustment is made, the rack bars 16 may be again turned to engage their teeth with the teeth of the pinions in which position they may be alternately moved inwardly or outwardly to open and close the jaws.

In Figs. 11 to 20 inclusive a body portion 1' is shown having a pair of slidably mounted jaws 11' which are provided with nuts 45 with which worms 46, carried by the opposite end portions of a transverse rod or shaft 47, are engaged, the opposite end portions of said shaft 47 being squared as indicated at 48 to receive an operating key, while the intermediate portion thereof is provided with a pinion 6' with which a number of transverse rack teeth 18', formed on the inner end of an operating bar 16', are engaged, said inner end of the bar 16' being notched as indicated at 19' whereby to allow its teeth to clear the pinion 6' when said bar is turned. In this form of the invention, the rod or bar 16' passes slidably and rotatably through a cone pulley 9 which is revolubly supported in the head stock 37', the outer end of said bar or rod being squared as at 24' for the reception of the wrench or similar tool and being provided with a peripherally grooved disk or ring 26' which, through the action of a fork 34' and an air cylinder 40' is employed for the purpose of shifting the bar 16' inwardly or outwardly thereby rotating the pinion 6', the shaft 47 and the worms 46, the action of the latter now moving the jaws 11' inwardly or outwardly as the case may be.

From the foregoing description taken in connection with the accompanying drawings, it will be seen that although the herein described improvements in chucks reside practically in the mere provision of a notch at one end of a rack bar and means whereby said bar may be shifted and turned, these improvements greatly increase the efficiency of the chuck and allow the jaws of the same to be adjusted independently of any movement whatever on the part of the rack bar yet allowing said rack to be employed to equal advantage whether the jaws be adjusted for large or small work.

I have described my invention with considerable detail and have set forth certain specific means whereby the rack bars may be shifted and turned but it will be readily understood that any suitable means for accomplishing this effect lies within the scope of the present invention and I do not wish to therefore be limited otherwise than as set forth in the appended claims.

Having thus described my invention, what I claim as new and desire to secure by Letters Patent is—

1. In a chuck, the combination with a body portion, a plurality of gripping jaws movably mounted thereon, and a pinion whereby to operate said jaws, of an operating bar slidably and rotatably mounted in said body, teeth on said bar meshing with those on the pinion, one end portion of certain of said teeth being removed whereby to allow the same to clear the pinion when the bar is rotated, means whereby said bar may be shifted and other means whereby said bar may be rotated.

2. In a chuck the combination with a body portion, a plurality of gripping jaws movably mounted thereon, and a pinion whereby to operate said jaws, of a cylindrical operating bar slidably and rotatably mounted in said body, a number of rack teeth formed on one end of said bar and meshing with the teeth on said pinion, one end portion of certain of said rack teeth being removed, whereby to allow the same to clear the pinion when the bar is rotated, means on the opposite end of said bar for shifting the same longitudinally and a polygonal portion on the bar whereby the same may be rotated.

3. In a chuck, the combination with a body portion, a plurality of movably mounted gripping jaws thereon, and a pinion whereby to operate said jaws, of an operating rack bar slidably and rotatably mounted in said body portion, one end portion and likewise the ends of certain of the teeth of said rack bar being notched, said bar normally engaging said pinion, means whereby said bar may be shifted longitudinally and means whereby the same may be partially rotated to position said notch adjacent the active teeth of the pinion for the purpose set forth.

4. In a chuck, the combination with a body portion, a plurality of gripping jaws movably mounted thereon, and a pinion whereby to operate said jaws, of a guide member formed on the inactive end of said body, a ring slidably encircling said guide member and having an opening whose axis lies parallel to the axis of the body, a cylindrical bar having one end portion provided with an inwardly spaced shoulder, said portion passing through said opening, a stop on the free end of said portion, the body of said bar being slidably and rotatably mounted in said body, rack teeth on said body of the bar and engaged, with said pinion, certain of the ends of said teeth being removed to allow the same to clear the pinion when the bar is rotated, means whereby said ring may be shifted upon said guide member and means whereby said bar may be rotated.

In testimony whereof I have hereunto set my hand in presence of two subscribing witnesses.

ALBERT E. CHURCH.

Witnesses:
CARL S. MUELLER,
GEORGE H. INGRAHAM.